United States Patent [19]

Cassou et al.

[11] Patent Number: 4,463,707
[45] Date of Patent: Aug. 7, 1984

[54] APPARATUS FOR PRESENTING ANIMALS, ESPECIALLY POULTRY, FOR ARTIFICIAL INSEMINATION OPERATIONS

[76] Inventors: Robert Cassou, Rue Clémenceau; Bertrand Cassou, St Symphorien des Bruyères; Maurice Cassou, Rue Clémenceau, all of 61300 L'Aigle, France

[21] Appl. No.: 384,436

[22] Filed: Jun. 2, 1982

[30] Foreign Application Priority Data

Jan. 27, 1982 [FR] France .................. 82 01254

[51] Int. Cl.³ .......................... A01K 37/00
[52] U.S. Cl. ................................ 119/97 R
[58] Field of Search ................ 119/97 R, 48

[56] References Cited

U.S. PATENT DOCUMENTS

| 2,484,088 | 10/1949 | Hayes | 119/97 R |
| 2,966,884 | 1/1961 | Naraghi | 119/48 X |
| 3,132,735 | 5/1964 | Nilsen | 119/48 X |
| 3,774,578 | 11/1973 | Randolph et al. | 119/97 R |
| 3,880,122 | 4/1975 | Randolph et al. | 119/97 R |

Primary Examiner—Hugh R. Chamblee
Attorney, Agent, or Firm—Andrus, Sceales, Starke & Sawall

[57] ABSTRACT

The invention relates to apparatus for presenting poultry or similar animals for artificial insemination, or for collecting semen.

The technical problem is to reduce the displacements and manipulations of the operator and facilitate the operations so as to ease the work of a sole operator.

The invention provides apparatus comprising a carriage movable along a battery of cages, a grip lockable in a position in which it grips the birds' hind legs, a guide for supporting the body of an animal restrained by the grip and for guiding the animal back into the cage when it is released from the grip, the grip and guide being mounted on a mount in adjustable positions on the carriage.

The invention is used primarily in artificial insemination operations on poultry.

18 Claims, 10 Drawing Figures

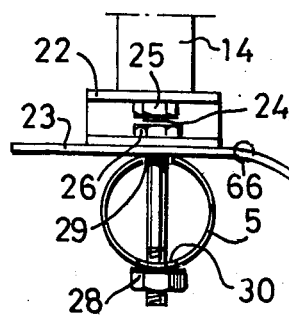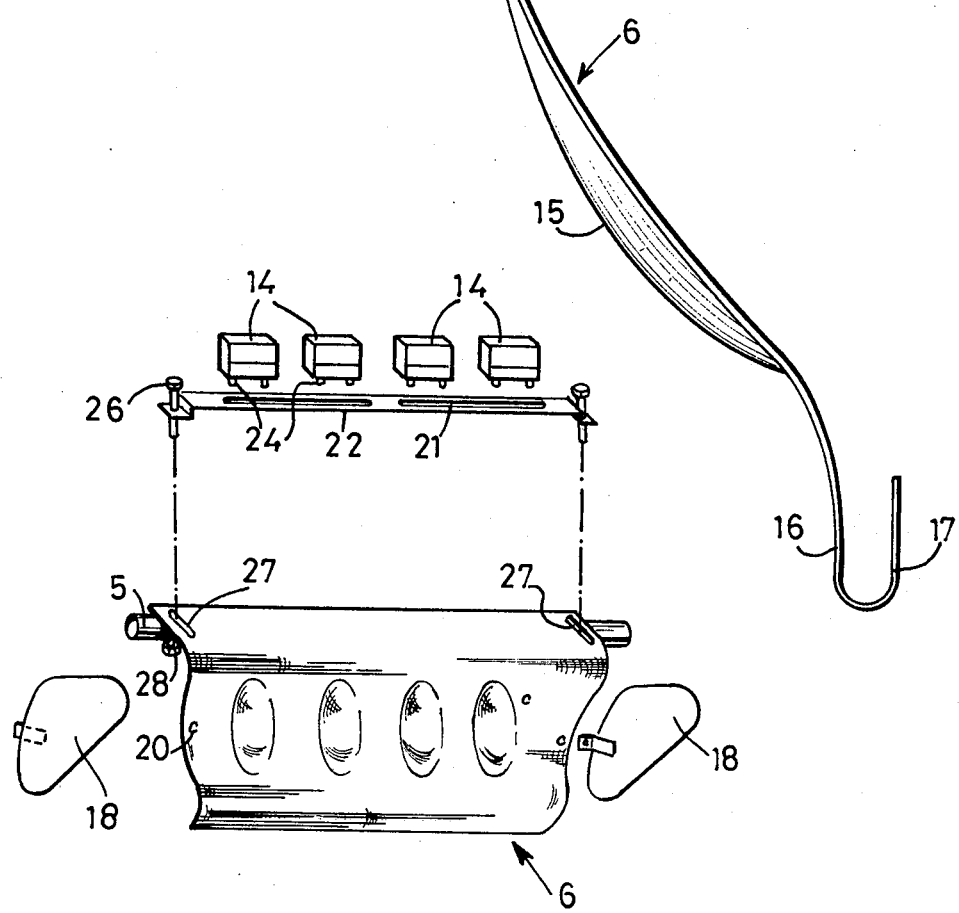
FIG. 2
FIG. 3

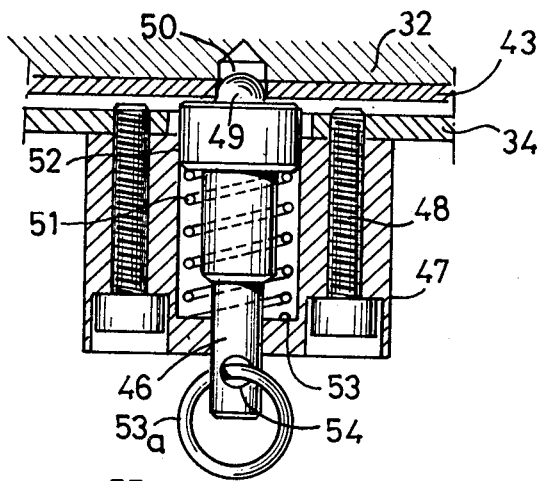
FIG.7
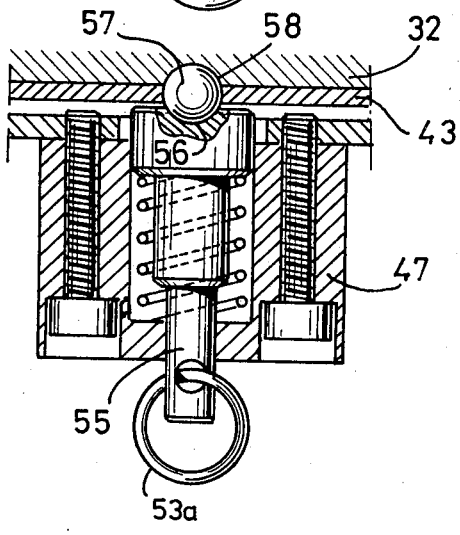
FIG.8
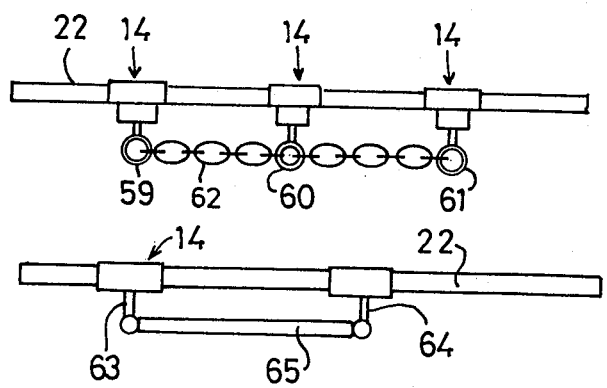
FIG.9
FIG.10

APPARATUS FOR PRESENTING ANIMALS, ESPECIALLY POULTRY, FOR ARTIFICIAL INSEMINATION OPERATIONS

The present invention relates to apparatus for presenting animals for artificial insemination operations, both collecting semen from male animals and inseminating female animals. The invention is particularly suitable for poultry, such as hens, guinea fowl and turkeys, but is also applicable to other similar sized animals.

When rearing poultry, artificial insemination is commonly used as a method of reproduction. It can be performed on the ground, or in batteries of cages which may be individual or collective. It is important to reduce the amount of human labour required for collecting semen and inseminating birds, and this is determined by the techniques and technology used.

Currently, portable insemination apparatus is available which enable a single operator using modern work techniques to cope with a large number of birds. However, there remain a number of movements for the operator to make when capturing the bird, restraining it, and collecting semen or inseminating it, which take significant lengths of time.

This becomes a particular problem in the case of inseminating hens, for example, since the profitability of the operation is determined by the speed of work, which, in order to be effective, should avoid as far as possible being awkward for the operator as well as the animals. In particular it is desirable to free the operator from the necessity to restrain the bird and that his displacements, and those of the birds should be as limited as possible (gain in time).

Accordingly an object of the present invention is to provide for presenting the animals for artificial insemination operations close to their cages while the operator has both hands free to use. The apparatus is capable of movement from one cage to another.

The present invention provides apparatus for presenting animals for artificial insemination operations comprising a carriage for movement along a battery of cages containing the animals, grip means having a closed position for gripping hind legs of the animal and an open position for releasing the animal, locking means for releasably locking said grip means in said closed position, a guide member for juxtaposition to said grip means to support the body of an animal restrained by said grip means and to guide the animal into a cage when released from said grip means, and mount means for mounting said grip means and said slide member in adjustable positions on said carriage.

In a preferred embodiment of the invention said guide member comprises a slide for positioning obliquely below said grip means, whereby the released animal is guided to slide down into a cage.

The operator using this apparatus may place the carriage in front of a battery, take an animal by its hind legs, place the animals body on the guide means and restrain the hind legs in the grip means, perform the artificial insemination operation, and then release the animal, who is then guided back into its cage.

An advantageous embodiment of the invention provides apparatus of the above kind comprising a plurality of said grip means for restraining a plurality of animals, said guide member extending across each of said grip means to support and guide said animals. Preferably said guide member comprises side cheeks, and a plurality of hollows associated with respective grip means for supporting the animals.

In a convenient arrangement in accordance with the invention, said grip means comprises first and second relatively movable jaws, said mount means comprising a horizontal mount member for securing above said guide member. Advantageously said first jaw extends generally vertically in a position fixed relative to said mount means, and said second jaw is mounted pivotingly relative to said mount means about a horizontal axis, said jaws having facing edges which are juxtaposed in said closed position, said edges presenting at least one recess for receiving at least one of said hind legs, said edges closing said recess when said grip means is in said closed position and opening said recess when in said open position.

Other features and advantages of the invention will appear from the following description, given by way of non-limitative example, with reference to the accompanying drawings, in which:

FIG. 2 is a side view of the apparatus of FIG. 1 without its carriage;

FIG. 3 is a diagrammatic perspective view of the apparatus of FIG. 2;

FIG. 7 is a plan view to an enlarged scale of a detail of FIGS. 4 to 6;

FIG. 8 is a view similar to FIG. 7 of an alternative embodiment; and

FIGS. 9 and 10 show diagrammatically systems for connecting a plurality of restraining grips for restraining a plurality of birds.

Figure 1:
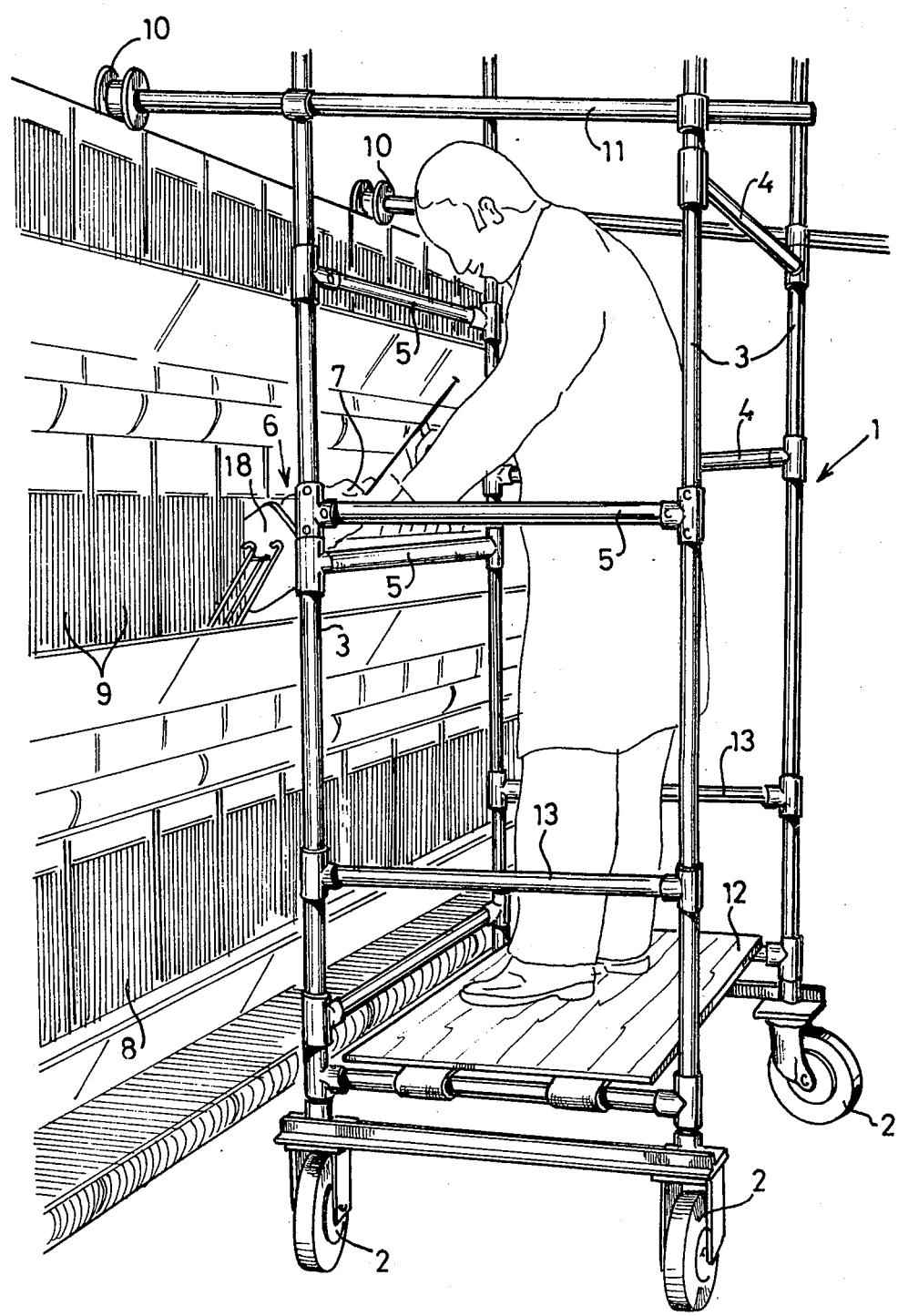
FIG. 1 is a general perspective view of an apparatus in accordance with the invention.

FIG. 1 is a general view of an apparatus according to the invention, comprising a carriage 1, mounted on four wheels 2, and comprising vertical uprights 3 connected rigidly to horizontal members 4 and bearing horizontal tubular members 5, on one of which is fixed adjustably and removably a member 6 for holding and guiding birds (shown diagrammatically at 7) bearing grips (see FIG. 2 and following) for restraining the birds (not shown in those Figs.). The carriage 1 can be displaced in front of the superimposed batteries 8 of individual cages 9 containing the birds-hens for example—parallel to the batteries of cages, being guided by rollers 10 fixed on extensions of horizontal arms 11 mounted at the top of the carriage 1. The carriage comprises also a floor 12 for bearing the operator and which can be positioned at different heights, for example on the horizontal struts such as 13 whose height is adjusted by ordinary means (not shown) on the uprights 3, enabling the operator to sit or stand thereon according to the level of the battery he is working on.

In FIGS. 2 and 3, for the sake of clarity are shown only the member 6 for holding and guiding the birds and the grips 14 for restraining the birds, which is solid with the member 6, as described below.

The member 6 for holding and guiding the birds comprises a concave board in the form of a slide whose central part may comprise shallow hollows 15 (shown in broken lines in FIG. 3) giving improved support and positioning of the birds, the lower edge 16 of the board being vertical, and terminating if desired in a portion 17 turned back up to act as a gutter for collecting droppings from the bird.

The board 6 also comprises removable side cheeks 18, fixed at the side edges of the board by tabs 19 penetrating into holes 20 in the board at a spacing corresponding to a given number of birds (four in this example). This board extends downwards from the grips 14 for restraining the birds, described hereinafter in more detail, which are fixed for lateral adjustment in a slider 21 of an elongate horizontal flat strip 22 fixed solidly to a horizontal top part 23 of the board 6. The restraining grips 14 are fixed to the strip 22 by threaded rods 24 projecting from the bottom of the grips through the slider 21 and cooperating nuts 25.

The strip 22 is secured to the horizontal top 23 of the board 6 by fixing means such as bolts 26 passing through holes in offset ends of the strip (see FIG. 3) and elongate slots 27 in the board 6 so that the position of the board 6 can be adjusted relative to the tube 5 of the frame and secured by knurled nuts 28. In addition, the tube 5 may comprise, at the position of each bolt 26, an upper hole 29 of diameter such as to fit the shank of the bolt 26 and a lower hole 30 of elongate shape, such as an oval. These arrangements enable the position of the board to be adjusted laterally along the tube 5 of the frame and also obliquely so as to be more or less inclined relative to the carriage 1 and the cages 9.

Figure 4:
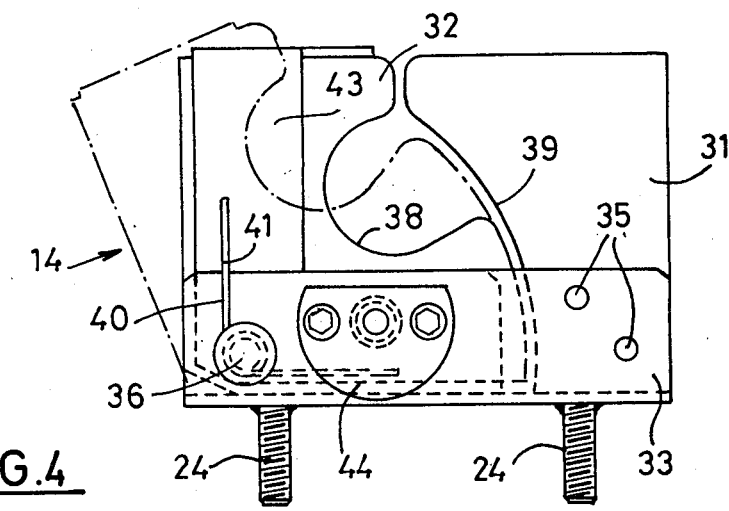
FIGS. 4, 5 and 6 are, respectively, side elevation, plan and end views of grips for restraining an animal, provided in the apparatus according to the invention of FIGS. 1 to 3.
Figure 5:
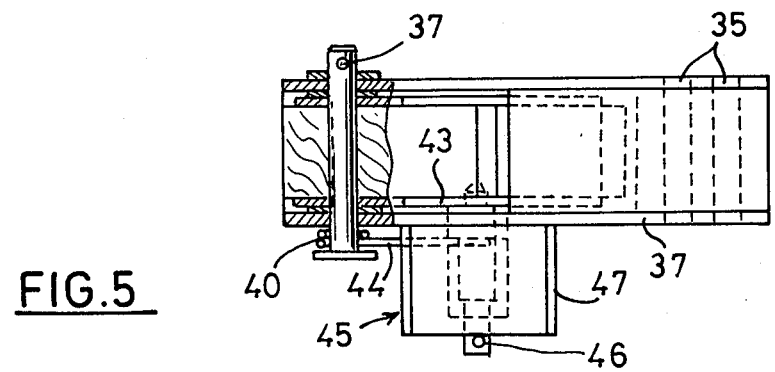
Figure 6:
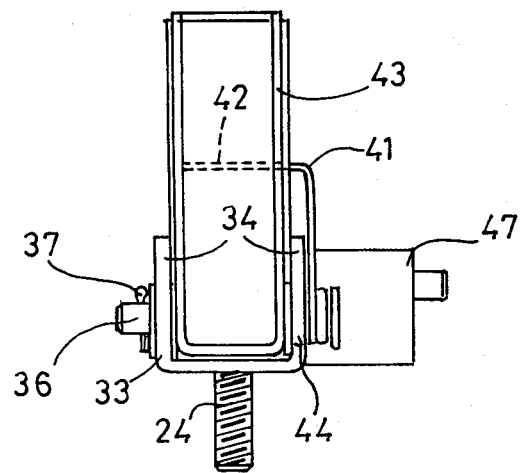

Hereinafter, with reference to FIGS. 4 to 6 will be described the grips 14 for restraining each bird in accordance with the invention. The grips 14 comprise essentially a fixed jaw 31 in the form of a solid shoe or pad extending generally vertically, and a movable jaw 32 in the form of a second generally vertical solid shoe or pad, the jaws being made preferably from a material reducing the risk of injury to the birds, such as rubber. The fixed jaw 31 is secured to a support 33 comprising a U-shaped member, which presents side cheeks 34 whose height is lower than that of the jaws 31, 32, by bolts 35. The movable jaw 32 is mounted to pivot about a horizontal shaft 36 fixed for free rotation at the other end of the support 33 between a closed position (shown in full lines in FIG. 4) and an open position (shown in broken lines), the jaw 32 moving freely between the cheeks 34 of the support 33.

The movable jaw 32 comprises a transverse recess 38 of suitable flared shape, while the edge of the jaw 31 facing the jaw 32 presents a concave curve 39. The cooperating edge of the jaw 32 below the recess 38 presents a complementary convex curve, so that when the grip is closed the jaws define an aperture which is preferably generally pear shaped in transverse section to receive both feet of a bird.

In addition, the grip 14 comprises a return spring 40 biasing the jaw 32 towards the open position, the spring 40 being turned round the shaft 36 and comprising an upper arm 41 having a part 42 bent horizontally to secure the arm to rigid side cheeks 43 sandwiching the jaw 32 and secured thereto, and a lower arm 44 secured to one of the cheeks 33 between which the jaw 32 pivots.

Moreover the restraining grips 14 for each bird comprise a system 45 for locking the movable jaw 32 in the closed position. This system shown in more detail in FIG. 7 comprises a plunger 46 mounted to slide longitudinally perpendicular to the jaws 31 and 32 in a moulded block 47 fixed to the support 33 of the jaws by bolts 48. The plunger 46 comprises an inner projection 49 engaging in the locked closed position in a cooperating recess 50 formed in the side cheek 43 of the movable jaw 32, being permanently biased by a spring 51 interposed between a shoulder 52 on the plunger and the base 53 of the moulded block.

In this version, when the plunger 46 is pulled by a ring 53a secured in a hole in the outer end of the plunger, the projection 49 leaves the recess 50 which frees the jaw 32, and the jaw is lifted to the open position by the permanent bias of the return spring 40.

FIG. 8 shows an alternative embodiment of the locking system for the movable jaw, which in this case comprises a plunger 55 whose inner end presents a part-spherical recess 56 suitable for receiving part of a ball 57 which sits in a corresponding recess 58 formed in the cheek 43, the ball being retained therein by suitable means (not shown), or the ball being replaced by a nipple of hemispherical shape formed in the cheek 43.

In this embodiment, the unlocking of the movable jaw 32 is performed in the same way as before by pulling a ring 53a secured to the outer end of the plunger.

FIG. 9 shows an embodiment in which a plurality of restraining grips 14 are mounted on the strip 22, the associated locking systems having rings 59, 60 and 61 which are connected by a chain 62 whereby all the locking devices may be unlocked together, to free a plurality of birds simultaneously, after insemination, by pulling on the chain and hence pulling all the rings together.

In FIG. 10 an embodiment is shown in which a plurality of restraining grips 14 are connected by a bar 65 pivoted on and connecting the outer ends of the plungers 63, 64, the connections being made by suitable means (not shown), whereby the bar 65 may be actuated to free two birds simultaneously, or to free one while keeping another restrained in the second grip.

In another embodiment of the invention, the board 6 may be hinged to the strip 22 by suitable means (not shown), instead of being rigidly fixed thereto, so that its inclination may be adjusted and the board then fixed in position by devices (not shown) for example screwable means on the frame uprights of the carriage 1.

In another embodiment, the jaw 31 is adjustable in position relative to the angularly movable jaw 32, so as to vary the width of the recess 38, to adapt the recess to different sized birds' feet. This adjustment can readily be performed by providing openings in the support 33 to enable adjustment of the position of the jaw 31, the jaw then being fixed in position relative to the jaw 32 by bolts (not shown).

We claim:

1. Apparatus for presenting animals for artificial insemination operations comprising a carriage for movement along a battery of cages containing the animals, grip means having a closed position for gripping hind legs of the animal and an open position for releasing the animal, locking means for releasably locking said grip means in said closed position, a guide member for juxtaposition between said grip means and a cage to support the body of an animal restrained by said grip means and to guide the animal positively toward and into a cage when released from said grip means, and mount means for mounting said grip means and said slide member in adjustable positions on said carriage.

2. Apparatus as claimed in claim 1 wherein said grip means is adjustable in lateral position on said mount means, and said apparatus including means for securing the lateral position of said grip means.

3. Apparatus as claimed in claim 1 wherein said locking means includes a pull-ring manually actuable to unlock said grip means.

4. Apparatus as claimed in claim 1 and including a plurality of said grip means and associated locking means, and a flexible member connecting said locking means whereby to unlock said grip means.

5. Apparatus as claimed in claim 1 and including a plurality of said grip means and associated locking means, and a bar pivotally connected to said locking means for selectively unlocking one or both associated locking means.

6. Apparatus as claimed in claim 1 and including spring means biasing said grip means to said open position.

7. Apparatus as claimed in claim 1 and including a rail extending parallel to said battery of cages, said carriage comprising rollers for engaging said rail whereby to guide movement of said carriage along said battery of cages.

8. Apparatus as claimed in claim 1 wherein said grip means comprises first and second relatively movable jaw members, said mount means comprising a horizontal mount member for securing above said guide member.

9. Apparatus as claimed in claim 5 wherein said jaw members include pads of resilient material.

10. Apparatus as claimed in claim 8 wherein said first jaw member extends generally vertically in a position fixed relative to said mount means, and said second jaw members is mounted pivotingly relative to said mount means about a horizontal axis, said jaw members having facing edges which are juxtaposed in said closed position, said edges presenting at least one recess for receiving at least one of said hind legs, said edges closing said recess when said grip means is in said closed position and opening said recess when in said open position.

11. Apparatus as claimed in claim 5 or 6 wherein said locking means comprises a plunger longitudinally slidable between an engagement position and a disengagement position, cooperating means on a relatively movable one of said jaws and on said plunger for locking said jaw members in the closed position when said plunger is in said engagement position, resilient means biasing said plunger towards said engagement position and withdrawal means whereby said plunger may be withdrawn to said disengagement position.

12. Apparatus as claimed in claim 11 wherein said cooperating means comprises a projecting member and a recess.

13. Apparatus as claimed in claim 8 or 10 wherein said first and second jaw members are mounted for relative adjustment whereby to adjust said grip means to different sized animals.

14. Apparatus as claimed in claim 1, wherein said guide member comprises a slide for positioning obliquely below said grip means, whereby the released animal is guided to slide down into a cage.

15. Apparatus as claimed in claim 14 wherein said mount means includes bolts extending through said guide member and said mount means through cooperating holes, at least some of said holes being elongate whereby to allow adjustment of the inclination of said guide member.

16. Apparatus as claimed in claim 14 wherein said guide member is hinged to said mount means whereby to enable adjustment of the inclination of said guide member, and including means cooperating with said carriage for maintaining said guide member at a selected inclination.

17. Apparatus as claimed in claim 14, and comprising a plurality of said grip means for restraining a plurality of animals, said guide member extending across each of said grip means to support and guide said animals.

18. Apparatus as claimed in claim 17, wherein said guide member comprises side cheeks, and a plurality of hollows associated with respective grip means for supporting the animals.

* * * * *

UNITED STATES PATENT AND TRADEMARK OFFICE
CERTIFICATE OF CORRECTION

PATENT NO. : 4,463,707

DATED : August 7, 1984

INVENTOR(S) : ROBERT CASSOU ET AL

It is certified that error appears in the above-identified patent and that said Letters Patent is hereby corrected as shown below:

Column 4, Line 2, before "spring 51", insert ---compression---

Column 4, Line 16, after "or", insert---alternatively---

Column 5, Line 10, after "to", insert---two---

Column 6, Line 2, cancel "jaws" and substitute therefor ---jaw members---

Column 6, Line 3, after "jaws", cancel "members", and substitute therefor---member---

Column 5, Line 31, cancel "members" and substitute therefor---member---

Signed and Sealed this

Eighth Day of January 1985

[SEAL]

Attest:

Attesting Officer

GERALD J. MOSSINGHOFF

Commissioner of Patents and Trademarks